Patented May 17, 1932

1,858,830

UNITED STATES PATENT OFFICE

JOHN C. KRATOVILLE, OF IRONTON, OHIO, ASSIGNOR TO THE BARRETT COMPANY, OF NEW YORK, N. Y., A CORPORATION OF NEW JERSEY

WATERPROOFING COMPOSITION AND METHOD OF PREPARING

No Drawing. Application filed July 26, 1927. Serial No. 208,653.

This invention relates to waterproofing materials and relates particularly to a waterproofing material containing aluminum stearate used mainly for dampproofing concrete, stone, masonry, etc.

Small quantities of aluminum stearate have heretofore been dissolved in naphtha for producing this type of waterproofing material, but it has always been found that where the aluminum stearate content of the composition is allowed to exceed approximately 2% to 3% that the solution will not remain freely mobile at atmospheric temperatures or, at least, at freezing temperatures. In other words, where it has been attempted to form a solution of more than 2% to 3% aluminum stearate the entire solution will either become viscous and gel-like in consistency when cooled to atmospheric temperatures or such quantity of the aluminum stearate as exceeds approximately 2% to 3% of the composition will separate out as a thick gel of aluminum stearate when the temperature of the composition is reduced to atmospheric temperatures. Even in the case of a 2% to 3% solution of stearate which is cooled to atmospheric temperatures, it may be so viscous as to cause difficulty in application.

I have found that the waterproofing composition must be freely mobile at all atmospheric temperatures, i. e., at winter temperatures as well as summer temperatures encountered in the application of the composition, in order that it will properly penetrate or impregnate the material being treated. Before my invention, this result could not be obtained satisfactorily without maintaining the aluminum stearate content of the composition at a very low percentage.

I have discovered that by adding a small quantity of a peptizing agent such as those hereinafter named, the composition may be made to contain much more than 2% to 3% aluminum stearate without the composition becoming viscous or gelatinous in consistency, or without the aluminum stearate separating out as a gel, at atmospheric temperatures. It is quite desirable to have a relatively high aluminum stearate content for the composition inasmuch as the aluminum stearate is the active waterproofing ingredient.

While I do not wish to be limited by any particular theory as to the function of a peptizing agent it is apparent that it operates to prevent a solution of aluminum stearate (mobile at higher temperatures) from gelatinizing or becoming viscous at atmospheric temperatures and that such a peptizing agent will also cause a viscous or gelatinous solution or composition of aluminum stearate in a solvent to become freely mobile at atmospheric temperatures. Whether the peptizing agent causes a dispersion of the gels or takes up minute percentages of water present or causes the breaking down of the aluminum stearate soap which may be formed is not clearly known and is likewise not material so far as the real fact is concerned that I have discovered the utility of the peptizing agents referred to in the capacity set forth.

In producing this type of waterproofing composition, I have found that naphthas derived either from coal tar or petroleum and such as are used in the manufacture of paints and varnishes may be used. These normally have a flash-point slightly above 100° C. By using such a material for the solvent, maximum penetration of the waterproofing compound is obtained due to the fact that too rapid an evaporation of the solvent from the surfaces being treated does not occur. Furthermore, dangers connected with the shipping of highly volatile materials are minimized. I do not, however, limit myself to the aforementioned naphthas inasmuch as benzene, toluene or gasoline may likewise be used in many cases with entire satisfaction.

As a specific example of the manner in which my improved waterproofing composition may be made the following may be used, but it is obvious that I do not intend to be limited by a statement as to specific temperatures, quantities, etc.

A quantity of naphtha is heated to a temperature of approximately 80° C. and aluminum stearate in the ratio of 2 to 10 parts by weight of stearate to 100 parts of naphtha is added to the hot naphtha. The two materials are then agitated until a complete solution of the stearate in the naphtha is effected. A quantity of anhydrous acetic acid, equivalent to 0.3% to 1.5% by weight of the solution, is then added and the resulting mixture is thoroughly agitated. The product thus obtained is a clear solution having a specific viscosity Engler at 0° F. of 15 to 45 seconds per 100 cc. which can be stored without fear of gelling occurring at ordinary atmospheric temperatures and which may be applied to the substance to be waterproofed by means of a brush, spray or other device, and good penetration be obtained.

Obviously my process may be varied in many ways. For instance, the naphtha may be substituted by other coal tar or petroleum distillates, by turpentine or other commonly used solvents for aluminum stearate. Other organic acids especially carboxylic acids, which are characterized by the presence therein of an (OH) or hydroxyl group such as stearic, oxalic, tartaric, or phthalic acid may be substituted for the acetic acid as a peptizing agent. Even phenolic compounds which also contain a hydroxyl group and are acidic in character, such as phenol and ortho, meta and para cresol may be used instead of acetic acid. Heating the solvent to a temperature of 80° C. is not absolutely necessary, but merely hastens the solution of the aluminum stearate therein.

In the claim where an "organic solvent" is referred to, it is intended to include any of the solvents mentioned above, as well as their equivalents; "naphtha" is intended to include both coal tar and petroleum naphthas whether of a high or low flash-point, and an "organic acid" or "peptizing agent" is intended to include such peptizing acids as are above named as well as their equivalents.

I claim:—

1. A solution of aluminum stearate in an organic solvent freely mobile at all atmospheric temperatures and consisting of at least three parts of aluminum stearate in not more than 100 parts of organic solvent therefor, and a small amount of an acidic organic compound containing a hydroxyl group.

2. A mobile solution of aluminum stearate in naphtha consisting of about 10 parts of aluminum stearate in each 100 parts of naphtha and a small amount of an acidic organic compound containing a hydroxyl group.

3. A composition freely mobile at atmospheric temperatures and suitable for waterproofing concrete, said composition consisting of at least three parts of alumium stearate in solution in 100 parts of an organic solvent, and a small amount of acetic acid as a peptizing agent.

4. A waterproofing composition freely mobile at atmospheric temperatures and suitable for waterproofing concrete, said composition consisting of at least three parts by weight of aluminum stearate in solution in 100 parts of naphtha and from 0.3 to 1.5 parts of glacial acetic acid as a peptizing agent, said composition being characterized by an Engler viscosity at 0° F. of about 15 to 45 seconds per 100 cc.

5. A permanently mobile waterproofing solution suitable for waterproofing concrete by penetration of the surface thereof, consisting of at least three parts of aluminum stearate in not more than 100 parts of organic solvent therefor, and a small amount of peptizing agent and having an Engler viscosity not greater than 45 seconds per 100 cc. at 0° F.

6. A permanently mobile waterproofing solution suitable for waterproofing concrete by penetration of the surface thereof, comprising at least three parts of aluminum stearate in not more than 100 parts of organic solvent therefor, and a small amount of acetic acid, having a concentration of aluminum stearate of not less than approximately 3 per cent and an Engler viscosity not greater than 45 seconds per 100 cc. at 0° F.

In testimony whereof I affix my signature.

JOHN C. KRATOVILLE.